(12) United States Patent
Han et al.

(10) Patent No.: US 9,718,327 B2
(45) Date of Patent: Aug. 1, 2017

(54) FLOW CONTROL BAFFLE APPARATUS FOR VEHICLE HEATER

(71) Applicant: Hyundai Motor Company, Seoul (KR)

(72) Inventors: Su Dong Han, Gyeonggi-do (KR); Hun Woo Park, Namyangju (KR); Hyung Kook Kim, Gyeonggi-do (KR); Sung Wook Na, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 17 days.

(21) Appl. No.: 14/868,436

(22) Filed: Sep. 29, 2015

(65) Prior Publication Data

US 2016/0298661 A1 Oct. 13, 2016

(30) Foreign Application Priority Data

Apr. 7, 2015 (KR) .................. 10-2015-0048789

(51) Int. Cl.
| | | |
|---|---|---|
| *F24H 9/12* | (2006.01) | |
| *B60H 1/14* | (2006.01) | |
| *B60L 11/18* | (2006.01) | |
| *F28F 27/02* | (2006.01) | |
| *F28D 21/00* | (2006.01) | |
| *F28F 9/22* | (2006.01) | |

(52) U.S. Cl.
CPC .......... *B60H 1/143* (2013.01); *B60L 11/1892* (2013.01); *F28F 27/02* (2013.01); *F28D 2021/0091* (2013.01); *F28F 2009/222* (2013.01); *F28F 2230/00* (2013.01)

(58) Field of Classification Search
CPC ............... F28F 2009/222; B60H 1/143; B60L 11/1892; F28D 2021/0091

USPC .......................................... 138/37, 39, 45, 46
See application file for complete search history.

(56) References Cited

U.S. PATENT DOCUMENTS

| | | | | | |
|---|---|---|---|---|---|
| 585,804 | A | * | 7/1897 | Weber ................ | B65G 53/4633 138/37 |
| 1,877,567 | A | * | 9/1932 | Erbes ...................... | F16K 19/00 138/37 |
| 5,697,403 | A | * | 12/1997 | Onishi ................... | F23J 15/003 138/37 |
| 7,481,244 | B2 | * | 1/2009 | Bivin ..................... | G05D 7/012 138/37 |
| 2011/0174407 | A1 | * | 7/2011 | Lundberg ............. | B01F 5/0618 138/37 |

FOREIGN PATENT DOCUMENTS

| | | |
|---|---|---|
| JP | 2014-086157 A | 5/2014 |
| KR | 10-2005-0103799 A | 11/2005 |
| KR | 10-2012-0022001 | 3/2012 |

(Continued)

*Primary Examiner* — Patrick F Brinson
(74) *Attorney, Agent, or Firm* — Mintz Levin Cohn Ferris Glovsky and Popeo, P.C.; Peter F. Corless

(57) ABSTRACT

A flow control baffle apparatus for a vehicle heater is provided. The flow control baffle apparatus implements a flow control function of a fluid passing through the interior of a heater and improves the heat transfer performance of the heater. The flow control baffle apparatus for a vehicle heater includes a plurality of heater pipes that are disposed within the interior of a heater and a baffle pivotably disposed at both sides of the heater pipe to adjust the flow of a fluid. Wherein the baffle adjusts the flow rate of a fluid passing through the heater.

13 Claims, 3 Drawing Sheets

(56) References Cited

FOREIGN PATENT DOCUMENTS

| KR | 10-2014-0020885 | 2/2014 |
| KR | 10-2014-0076699 | 6/2014 |
| KR | 10-2015-0002983 A | 1/2015 |

* cited by examiner

FLOW CONTROL BAFFLE APPARATUS FOR VEHICLE HEATER

CROSS-REFERENCE TO RELATED APPLICATION

This application claims under 35 U.S.C. §119(a) the benefit of Korean Patent Application No. 10-2015-0048789 filed Apr. 7, 2015, the entire contents of which are incorporated herein by reference.

BACKGROUND (a) Technical Field

The present invention relates to an apparatus for a flow control baffle in a vehicle heater and more particularly, to a flow control baffle apparatus, which implements a flow control function of a fluid passing through the interior of a heater and improves the heat transfer performance of the heater.

(b) Background Art

Generally, fuel cell vehicles include a fuel cell stack that generates electric energy, a fuel supply unit that supplies a fuel (e.g., hydrogen) to the fuel cell stack, an air supply unit that supplies air as an oxidant required for the electrochemical reaction to the fuel cell stack, and a Thermal Management System (TMS). The TMS is a heat and water management system that removes reaction heat from the fuel cell stack to the exterior of the fuel cell system to adjust the operation temperature of the fuel cell stack.

Cooling water flowing within a cooling water line of the TMS cools the stack as a refrigerant. Upon cold startup of the system the cooling water, rapidly thaws the stack as a heating medium heated by the heater. Additionally, the TMS is provided with a cooling water heater for heating cooling water that is a refrigerant. FIG. 6 depicts a cooling water heater mounted within a stack cooling system of a typical fuel cell vehicle according to the related art. As shown in FIG. 6, the stack cooling system of a typical fuel cell vehicle, including a stack 1 and a heater 2 connected in parallel to each other, have a separate valve 3 that is used to control the flow rate of cooling water flowing to the stack 1 and the heater 2. Furthermore, when the heater is connected in series to the stack due to a limitation of a package, the heat transfer performance of the heater is reduced due to stagnation of cooling water on the heater slipstream, thereby increasing the difficulty cooling the heater.

The above information disclosed in this section is merely for enhancement of understanding of the background of the invention and therefore it may contain information that does not form the prior art that is already known in this country to a person of ordinary skill in the art.

SUMMARY

The present invention provides a flow control baffle apparatus for a vehicle heater, which allows a flow control baffle within the interior of a heater to implement the flow control function of a fluid passing through the interior of the heater. The heat transfer performance of a heater pipe slipstream may improve, preventing a cooling water stagnation phenomenon without requiring a separate valve for control of the flow rate of cooling water flowing in a fuel cell stack and a cooling water heater which may be connected in parallel and may thereby improve the cooling performance of the heater pipe.

In one aspect, a flow control baffle apparatus for a vehicle heater, may include a plurality of heater pipes disposed within the interior of a heater and a baffle pivotally disposed at a plurality of sides (e.g., both sides or opposing sides) of the heater pipe to adjust the flow of a fluid. The baffle may adjust the flow rate of a fluid passing through the heater. In an exemplary embodiment, the baffle may be disposed at a plurality of sides of each of the plurality of heater pipes disposed within the interior of the heater, and may enable flow rate control of a fluid flowing within the heater based on a rotation position of the baffle.

In another exemplary embodiment, a heating value of the heater pipe may be positioned at a maximum orientation and the baffle may pivot to a predetermined position for facilitating the flow of a fluid to a rear portion of the heater pipe. In another exemplary embodiment, to substantially increase (e.g., maximize) the flow rate of a fluid passing through the heater, the baffle may pivot and may move to a maximum position increasing the rotation angle (e.g., maximum rotation angle), increasing a flow field of a fluid between the baffle and the heater pipe. In addition, the heater may be turned to an off operational state, and the baffle may be positioned proximate to one portion (e.g., side) of the heater pipe, obstructing a flow field of a fluid between the baffle and the heater pipe and thus restricting (e.g., limiting or reducing) the flow of a fluid.

In another exemplary embodiment, the heater pipe may have a substantially circular cross-sectional shape, the baffles disposed at a plurality of opposing sides (e.g., both left and right sides) of the heater pipe may form a substantially planar shape which may be uniformly contoured (e.g. bent or curved), and pivots of the baffles may be disposed at a plurality of opposing sides (e.g., both left and right sides) of the rear portion of the heater pipe. In a further exemplary embodiment, the heater pipe may have a substantially oval sectional shape, the baffles disposed at a plurality of sides (e.g., both left and right sides) of the heater pipe may form a substantially planar shape which may be uniformly contoured, and pivots of the baffles may be disposed at a plurality of opposing sides of the central portion of the heater pipe.

In another exemplary embodiment, the heater pipe may have a tetragonal sectional shape and may have corners disposed at the plurality of opposing sides (e.g., left and right sides) of the heater pipe that face both the forward and backward portions of the heater. The baffles disposed at both left and right sides of the heater pipe may form a sustainably flat planar shape, and pivots of the baffles may be disposed at both left and right sides of the front end portion of the heater pipe. Further, the heater pipes within the interior of the heater may have a linear arrangement and may be arranged to be staggered in both left and right directions off of a centerline.

In some exemplary embodiments, the baffle may include a gasket positioned on a side surface thereof contacting the heater pipe to seal a gap between the baffle and the heater pipe when the baffle is positioned proximate to the heater pipe based on the rotation location of the baffle. The baffle may also include a rotation rigid body pivotably disposed within the heater and a gasket attached to a side surface of the rotation rigid body to seal a gap between the baffle and the heater pipe. The baffle may be disposed at a position where a rotation angle of the baffle may be limited to a certain range of motion by the heater housing and the heater pipe.

BRIEF DESCRIPTION OF THE DRAWINGS

The above and other features of the present disclosure will be more apparent from the following detailed description taken in conjunction with the accompanying drawings.

Figure 1:
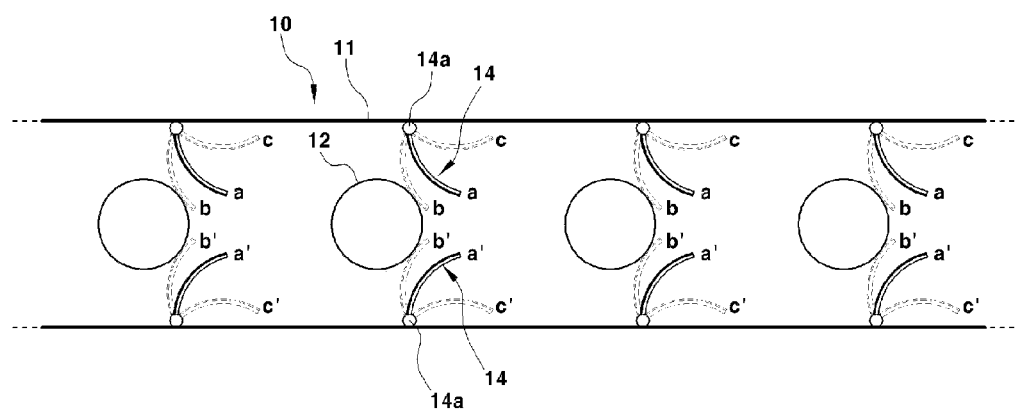
FIG. 1 is an exemplary embodiment of a view illustrating a flow control baffle apparatus for a vehicle heater according to an exemplary embodiment of the present invention.

Reference numerals set forth in the Drawings includes reference to the following elements as further discussed below:

10: heater
11: heater housing
12: heater pipe
14: baffle
14a: pivot
14b: rotation rigid body
14c: gasket

DETAILED DESCRIPTION

Advantages and features of the invention and methods of accomplishing the same may be understood more readily by reference to the following detailed description of exemplary embodiments and the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention provides a flow control baffle structure for a heater, having a complex function, which may perform a flow control function of a fluid supplied into a fluid heater and improve a heat transfer function of a heater pipe slipstream. According to exemplary embodiments, an existing valve for adjusting the flow rate of cooling water flowing into a cooling water heater and a fuel cell stack connected in parallel in a stack cooling system may be omitted, and the cooling performance of the heater pipe may be improved. Further, exemplary embodiments may include a fluid heater to which a flow control baffle structure for a heater may be applied, and a flow control baffle structure of a heater for heating cooling water of a stack cooling system.

As shown in FIG. 1, an exemplary embodiment of a heater 10 for heating a fluid including cooling water of a stack cooling system may be equipped with a plurality of heater pipes 12. When the heater pipes 12 are disposed in a linear arrangement within the interior of the heater 10, a high-temperature region may be locally formed on a rear portion (e.g., rear portion of the heater pipe based on the flow direction of a fluid) of the heater pipe 12, diminishing the heat transfer between the heater pipe 12 and cooling water. To improve the heat transfer coefficient at the rear portion of the heater pipe 12 and to implement a valve function for adjusting the flow rate of cooling water passing through the interior of the heater 10, a plurality of baffles 14 for the cooling water flow control may be pivotally disposed at a plurality of positions (e.g., both left and right sides) of the heater pipe 12 disposed within the interior of the heater 10.

Furthermore, the baffle 14 may have a substantially planar shape, and may extend in a longitudinal direction of the heater pipe 12, having a vertical length that corresponds to the length of the heater pipe 12, but the present invention is not limited thereto (not shown). Additionally, the baffle 14 may be mounted onto a surface of a heater housing 11 to be pivotally supported thereby, and may pivot as a pivot 14a rotates by an external actuator (not shown) connected to the pivot 14a. The baffle 14 may include a component for sealing a gap between the pivot 14a and the heater housing 11, but the present invention is not limited thereto. In particular, cooling water that passes through the interior of the heater 10 may predominantly pass between the heater pipe 12 and the baffle 14. For example, the pivot 14a of the baffle 14 may be pivotably disposed to be adjacent or proximate to the side wall surface of the heater housing 11.

Referring to the plan view of FIG. 1, the baffle 14 may have the pivot 14a positioned on one side end of the width direction thereof, and may rotate and move at an angle as the pivot 14a rotates. The baffle 14 may be disposed at a plurality of sides (e.g., both left and right sides) of the heater pipe where the rotation angle of the baffle 14 may be limited to a certain range of motion by the heater housing 11 and the heater pipe 12. Further, the heat transfer characteristics of the heater pipe 12 and the cooling water flow rate control may be altered by the position of the baffle 14. Additionally, the flow rate control of cooling water that passes through the heater 10 may be enabled by the baffle 14.

The baffles 14 disposed at a plurality of sides (e.g., both left and right sides) of the heater pipe 12 may rotate and move to position a and a' of FIG. 1. As further shown in FIG. 2, cooling water may pass through the heater 10 and may flow to the rear portion of the heater pipe 12 via the baffle 14 while flowing along the side end portions of the heater pipe 12. For example, the cooling water that passes through the heater 10 may uniformly flow along the surface of the heater pipe 12 including the rear portion of the heater pipe 12. The occurrence of a local high-temperature region may be prevented due to cooling water stagnation section (e.g., slipstream occurrence region) at the rear portion of the heater pipe 12. In particular, cooling water may exhibit an ideal flow pattern potential flow similar to a non-viscous fluid that passes a cylinder slipstream.

In some exemplary embodiments, the heat transfer performance of the heater pipe 12 may achieve maximum efficiency. For example, when the heat value of the heater pipe 12 is the greatest, (e.g., when the cooling of the heater pipe 12 is maximally required), the heat transfer performance and/or efficiency of the heater pipe 12 may be maximized by rotating the baffle 14 to a position where the fluid flow may be guided to the rear portion of the heater pipe 12 as described above. Additionally, as shown in FIG. 1 when the baffles 14 disposed at a plurality of sides (e.g, both left and right sides) of the heater pipe 12 are positioned at a and a', the flow rate of cooling water that passes through the heater 10 may be reduced when compared to a flow pattern where the baffles 14 are positioned at c and c' of FIG. 1. Accordingly, the flow rate control function may be achieved.

Figure 6:
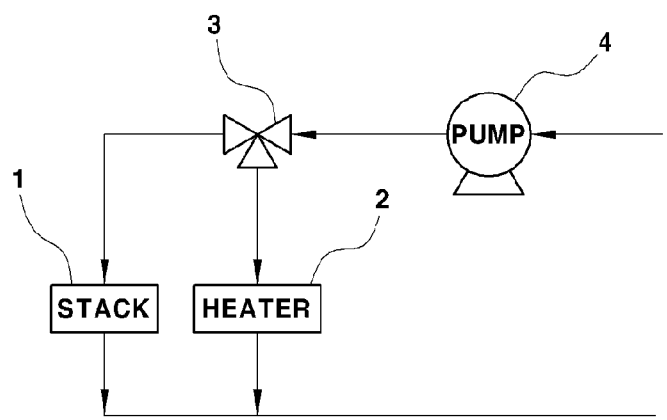
FIG. 6 is an exemplary embodiment of a view illustrating a portion of a stack cooling system of a typical fuel cell vehicle according to the related art.

As further shown in FIG. 6, the flow control may be required between a stack 1 and a heater 2 based on the discharge flow rate of a cooling water pump 4, the flow rate of cooling water that passes through a heater 2 may be adjusted without an existing a flow control valve 3, and thus the flow rate to the stack 1 may also be adjusted. For example, when the baffles 14 disposed at a plurality of sides (e.g., both left and right sides) of the heater pipe 12 are positioned at a and a' of FIG. 1, the flow rate of cooling water passing through the heater 10 may be increased, and the Revolution per Minute (RPM) of a cooling water pump may be increased in a smaller increment. Additionally, the flow velocity may be increased in conjunction with in a flow rate that may have a reduced cooling performance of the heater pipe 12 and it may be possible to reduce RPM of the cooling water pump.

In other words, as shown in FIG. 1, when the baffles 14 disposed at a plurality of sides (e.g, both left and right sides) of the heater pipe 12 are positioned at a and a', respectively, the passage between the heater pipe 12 and the baffles 14 that cooling water may flow through may be reduced (e.g., narrow) and the flow velocity of cooling water may increase. In particular, the RPM of the cooling water pump may be reduced due to the increase of the flow velocity of cooling water passing through the heater 10. For example, as shown in FIG. 1 the flow velocity of cooling water may increase when the baffles 14 are positioned at a and a'. Further the flow rate of cooling water passing through the heater 10 may be reduced compared to the flow rate when the baffles 14 are positioned at c and c' of FIG. 1. Accordingly, the flow rate control function may be achieved.

Moreover, the flow rate of cooling water passing through the heater 10 may be increased, (i.e., when the flow rate of cooling water flowing into the stack is at a minimum). The baffles 14 disposed at both left and right sides of the heater pipe 12 may rotate and move to positioned c and c' of FIG. 1. To attain a minimum flow rate of cooling water flowing into the stack, a differential pressure between the inlet of the stack and the outlet of the stack may be greater than a differential pressure between the inlet of the heater and the outlet of the heater 10. Additionally, a portion of cooling water may pass through the heater 10.

To maximize the flow rate of cooling water that may pass through the heater 10, the baffle 14 may rotate to increase the rotation angle (e.g., the maximum rotation angle), and may be disposed adjacent to the heater housing 11, thereby increasing the flow field of cooling water (e.g., fluid) between the baffle 14 and the heater pipe 12.

Figure 3:
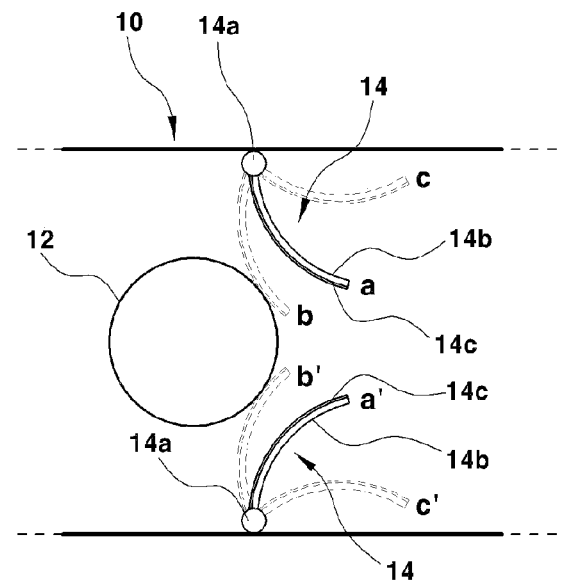
FIG. 3 is an exemplary embodiment of a view illustrating an airtight structure for a valve function of a baffle according to an exemplary embodiment of the present invention.

Additionally, the heater 10 may be turned to an off operational state, and the baffle 14 disposed at a plurality of sides (e.g., both left and right sides) of the heater pipe 12 may rotate and move to position b and b' of FIG. 1. For example, to reduce (e.g, minimize) the flow rate of cooling water that may pass through the heater 10 when the heater 10 is turned to an off operational state, the baffle 14 may be positioned proximate (e.g., adhered to) to one side (e.g, the rear portion) of the heater pipe 12, obstructing the flow field of cooling water between the baffle 14 and the heater pipe 12 and thus limiting the flow of fluid. As shown in FIG. 3, to secure the adhesion and the airtight seal, the baffle 14 may include a gasket 14c to seal a gap between the baffle 14 and the heater pipe 12. The gasket 14c may be disposed on a side surface of the baffle 14 which may contact the heater pipe 12 when rotating toward the heater pipe 12.

In particular, the baffle 14 may include a rotation rigid body 14b rotatably disposed within the heater 10 and a gasket 14c attached to the side surface of the rotation rigid body 14b and sealing a gap between the baffle 14 and the heater pipe 12 positioned proximate to the heater pipe 12. For example, the rotation rigid body 14b may be a rigid material having corrosion resistance, and the gasket 14c may be an airtight silicone-based material. The gasket 14c may be positioned to contact the surface of the heater pipe 12 when the heater 10 is turned to an off operational state, the gasket 14c may seal a gap between the heater pipe 12 and the baffle 14 without adverse heating effects (e.g., melting).

Figure 2:
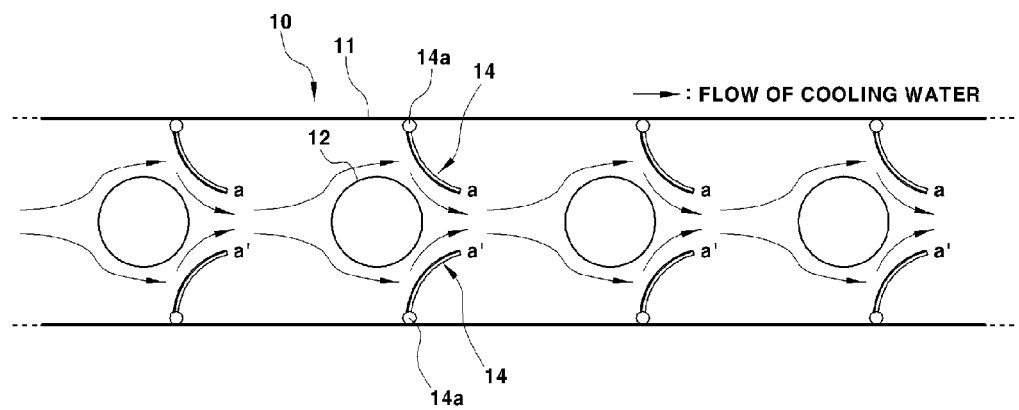
FIG. 2 is an exemplary embodiment of a view illustrating a baffle position and a fluid flow at the maximum heat transfer performance of a vehicle heater according to an exemplary embodiment of the present invention.

In an exemplary embodiment, the complex function (e.g., flow rate control function and improvement of heat transfer performance of heater pipe) may be implemented using various sectional shapes and arrays of heater pipes in addition to the heater pipe 12 having a substantially circular section as shown in FIGS. 1 to 3. As shown in FIGS. 1 to 3, the heater pipe 12 may have a substantially circular sectional shape, the baffles 14 disposed at the left and right sides of the heater pipe 12 may be formed to have a substantially planar shape (e.g, having a circular arc sectional shape) which may be uniformly contoured in a substantially curved surface shape, and the pivots 14a of the baffles 14 may be disposed at a plurality of sides (e.g., both left and right sides) of the rear portion of the heater pipe 12.

Figure 4A:
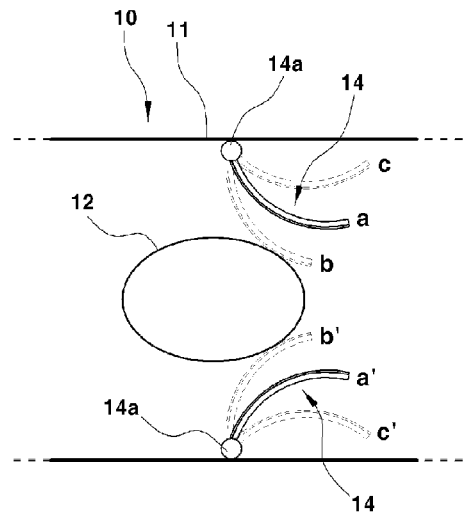
FIGS. 4A and 4B are an exemplary embodiments of a view illustrating the shape of a baffle and the pivot of the baffle according to the change of the sectional shape of a heater pipe embedded in a vehicle heater according to another exemplary embodiment of the present invention.
Figure 4B:
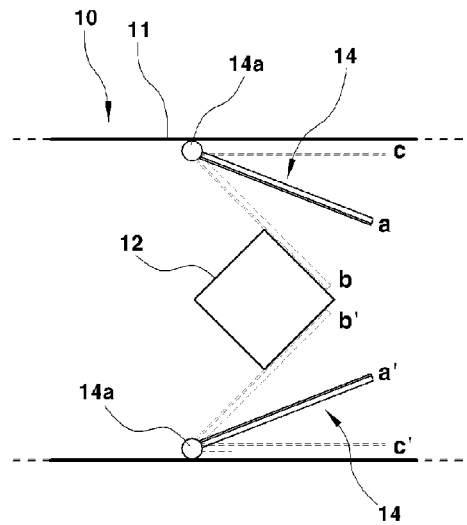

As shown in FIG. 4, the location of the pivot 14a of the baffle 14 may vary in accordance with the sectional shape of the heater pipe 12, and the shape of the baffle 14 may also vary. As shown in FIG. 4, the heater pipe 12 may have a substantially oval sectional shape, the baffles 14 may be disposed at a plurality of sides (e.g., both left and right sides)

of the heater pipe 12 may be formed to have a substantially planar shape (e.g, having a circular arc sectional shape) which may be uniformly contoured in a curved surface shape, and the pivots 14a of the baffles 14 may relatively move to the upper stream of cooling water flow, and may be located at a plurality of sides (e.g., both left and right sides) of the central portion of the heater pipe 12.

Additionally, as further shown in FIG. 4, the heater pipe 12 may have a substantially tetragonal sectional shape, the baffles 14 disposed at a plurality of sides (e.g., both left and right sides) of the heater pipe 12 may be formed to have a substantially flat planar shape, and the pivots 14a of the baffles 14 may move relatively to the upper stream of cooling water flow, and may be disposed at a plurality of sides (e.g., both left and right sides) of the front portion of the heater pipe 12. For example, each heater pipe 12 may be disposed such that the corners of a plurality of sides (e.g., both left and right sides) of the heater pipe 12 are positioned to face both front and rear sides of the heater pipe 10 based on the forward and backward flow direction of a fluid flowing in the heater 10, respectively.

Figure 5:
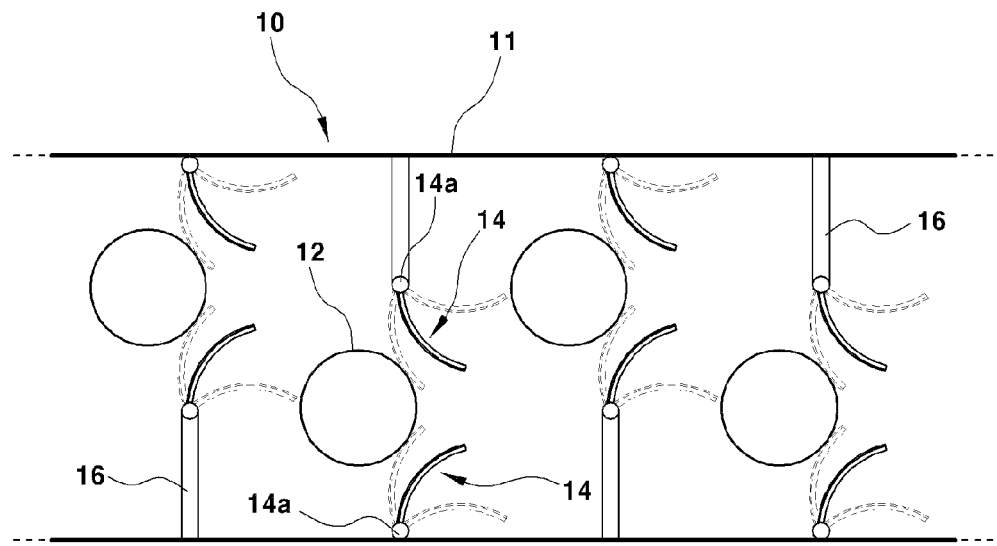
FIG. 5 is an exemplary embodiment of a view illustrating the mounting location of baffles according to the array of heater pipes within the interior of a vehicle heater according to an exemplary embodiment of the present invention.

Moreover, as shown in FIG. 5, the heater pipes 12 within the interior of the heater 10 may be arranged to be staggered in both left and right sides of a centerline, the baffles 14 may also be configured to be disposed at a plurality of sides (e.g., both left and right sides) of the heater pipe 12 based on the heater pipe 12 being the central line. However, in this case, in order to implement the flow rate control valve function of the baffle 14, a partition 16 connecting between the housing 10 and the pivot 14a may be disposed within the housing, or the flow field within the interior of the housing 10 may be changed into an S-shape (not shown). In particular, the function described above may be implemented. In other words, since the baffles 14 may be disposed at a plurality of sides (e.g., both left and right sides) of each heater pipe 12 within the interior of the heater to be pivotable within a certain range (e.g., angle), the flow rate of a fluid flowing in the heater 10 may be adjusted based on the rotation location of the baffles 14, and, the heat transfer performance of the heater pipe 12 may be improved.

A flow control baffle apparatus for a vehicle heater according to an exemplary embodiment of the present invention may improve the heat transfer function of a heater pipe and simultaneously secure a function of adjusting the flow rate of cooling water passing through the heater. Additionally, the flow control baffle apparatus for the vehicle heater may be utilized as a single part which functions as a valve and a cooling water heater for adjusting the flow rate supplied to the integrated stack and heater, by being applied to the cooling water heater and thus being installed in a typical stack cooling system.

The invention has been described in connection with what is presently considered to be exemplary embodiments, but on the contrary, is intended to cover various modifications and equivalent arrangements included within the sprit and scope of the appended claims. In addition, it is to be considered that all of these modifications and alterations fall within the scope of the present invention.

What is claimed is:

1. A flow control baffle apparatus for a vehicle heater, comprising:
   a plurality of heater pipes disposed within an interior of a heater; and
   a plurality of baffles pivotably disposed at a plurality of sides of the heater pipe to adjust the flow of a fluid, wherein each baffle adjusts the flow rate of a fluid passing through the heater.

2. The flow control baffle apparatus of claim 1, wherein each baffle is disposed at the plurality of sides of each of the plurality of heater pipes disposed within the interior of the heater, enabling flow rate control of a fluid flowing in the heater based on a rotation location of each baffle.

3. The flow control baffle apparatus of claim 1, wherein when a heating value of the heater pipes is increased, the baffles pivot to a position for guiding the flow of a fluid to a rear portion of the heater pipes.

4. The flow control baffle apparatus of claim 1, wherein to increase the flow rate of a fluid passing through the heater, the baffles pivot to a maximum rotation angle, increasing a flow field of a fluid between the baffle and the heater pipe.

5. The flow control baffle apparatus of claim 1, wherein when the heater is turned off, each baffle is adhered proximate to a side of each of the heater pipes, obstructing a flow field of a fluid between the baffle and the heater pipe and thus limiting the flow of a fluid.

6. The flow control baffle apparatus of claim 1, wherein when the heater pipes have a circular sectional shape, the baffles disposed at the plurality of sides of the heater pipes are formed to have a planar shape uniformly contoured, and pivots of the baffles are positioned at a plurality of sides of the rear portion of the heater pipes.

7. The flow control baffle apparatus of claim 1, wherein when the heater pipes have an oval sectional shape, the baffles disposed at the plurality of sides of the heater pipes are formed to have a planar shape which is uniformly contoured, and pivots of the baffles are positioned at a plurality of sides of the central portion of the heater pipes.

8. The flow control baffle apparatus of claim 1, wherein when the heater pipes have a tetragonal sectional shape and corners of the plurality of sides of the heater pipes face both forward and backward portions of the heater, the baffles disposed at the plurality sides of the heater pipe are formed to have a flat planar shape, and pivots of the baffles are positioned at a plurality of sides of the front portion of the heater pipes.

9. The flow control baffle apparatus of claim 1, wherein each baffle includes:
   a gasket on a surface thereof contacting each heater pipe to seal a gap between the baffle and the heater pipe when each baffle is adhered proximate to each heater pipe based on the rotation position of each baffle.

10. The flow control baffle apparatus of claim 1, wherein each baffle includes:
    a rotation rigid body pivotably disposed within the heater and a gasket attached to a surface of the rotation rigid body to seal a gap between the baffle and the heater pipe.

11. The flow control baffle apparatus of claim 1, wherein each baffle is disposed at a location where a rotation angle of each baffle is limited to a predetermined range by the heater housing and each heater pipe.

12. The flow control baffle apparatus of claim 1, wherein the heater pipes within the interior of the heater have a linear arrangement.

13. The flow control baffle apparatus of claim 1, wherein the heater pipes within the interior of the heater are arranged to be staggered in both left and right sides of a centerline.

* * * * *